United States Patent
Vichniakov et al.

(10) Patent No.: US 12,172,383 B2
(45) Date of Patent: Dec. 24, 2024

(54) SYSTEM AND METHOD FOR WELDING TWO THERMOPLASTIC WORKPIECES

(71) Applicant: Airbus Operations GmbH, Hamburg (DE)

(72) Inventors: Alexei Vichniakov, Hamburg (DE); Filipp Köhler, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 334 days.

(21) Appl. No.: 17/534,634

(22) Filed: Nov. 24, 2021

(65) Prior Publication Data

US 2022/0134675 A1    May 5, 2022

Related U.S. Application Data

(63) Continuation of application No. PCT/EP2020/061641, filed on Apr. 27, 2020.

(30) Foreign Application Priority Data

May 29, 2019 (DE) ................... 10 2019 114 446.9

(51) Int. Cl.
*B29C 65/08* (2006.01)
*B29C 65/00* (2006.01)
*B29K 101/12* (2006.01)

(52) U.S. Cl.
CPC .......... *B29C 65/08* (2013.01); *B29C 66/0016* (2013.01); *B29C 66/349* (2013.01); *B29K 2101/12* (2013.01)

(58) Field of Classification Search
CPC .................................................. B29C 66/349
See application file for complete search history.

(56) References Cited

U.S. PATENT DOCUMENTS 3,573,139 A    3/1971  Mori et al.
3,717,539 A *  2/1973  Roberts ............ B29C 66/91411
                                                  156/73.4

(Continued)

FOREIGN PATENT DOCUMENTS

DE    4206584 A1 *  9/1993  ............. B23K 20/10
JP    S64 22536      1/1989

OTHER PUBLICATIONS

European Office Action for U.S. Appl. No. 20/722,544 dated Feb. 7, 2023.

(Continued)

*Primary Examiner* — Daniel Mcnally
(74) *Attorney, Agent, or Firm* — KDW Firm PLLC (57) ABSTRACT

A system and method for welding two thermoplastic workpieces. The system has an ultrasonic tool, a support and a cooling unit. The ultrasonic tool is configured to generate mechanical vibrations. The system is configured to clamp together workpieces in the receiving region by the ultrasonic tool and the support if at least one fastening portion of the workpieces opposite one another is arranged in the receiving region. The ultrasonic tool is configured to introduce the mechanical vibrations into the fastening portion of the workpieces to weld the workpieces in a joining zone. The cooling unit is configured to cool, with cooling fluid, at least a part of the fastening portion of the workpieces and/or a cooling portion of the workpieces directly adjacent to the fastening portion.

8 Claims, 6 Drawing Sheets

(56) References Cited

U.S. PATENT DOCUMENTS

| | | | |
|---|---|---|---|
| 5,269,981 A * | 12/1993 | Jameson | B26F 1/26 |
| | | | 264/444 |
| 6,547,904 B1 | 4/2003 | Young | |
| 2003/0201053 A1 | 10/2003 | Young | |
| 2010/0147466 A1 | 6/2010 | Sans Marimon | |

OTHER PUBLICATIONS

German Search Report for Application No. 102019114446 dated Oct. 31, 2019.
International Search Report for Application No. PCT/EP2020/061641 dated Jul. 1, 2020.

\* cited by examiner

SYSTEM AND METHOD FOR WELDING TWO THERMOPLASTIC WORKPIECES

CROSS-REFERENCE TO RELATED APPLICATIONS

This application is a continuation of and claims priority to PCT/EP2020/061641 filed Apr. 27, 2020, which claims priority to German Patent Application No. DE 10 2019 114 446.9 filed May 29, 2019, the entire disclosures of which are incorporated by reference herein.

TECHNICAL FIELD

The disclosure herein relates to a system and a method for welding two thermoplastic workpieces.

BACKGROUND

It is known from the prior art that two thermoplastic workpieces can be welded to one another by ultrasound. For this, an ultrasonic tool is pressed onto the mutually oppositely arranged workpieces, with the result that ultrasound in the form of high-frequency mechanical vibrations acts on thermoplastic workpieces. A sufficient duration and/or a suitable amplitude of the mechanical vibrations cause(s) heating to occur between the workpieces on account of molecular and interface friction. This creates a joining zone between the two thermoplastic workpieces. It is often desirable that thermoplastic workpieces are not welded to one another solely at a single point. In fact, it is not infrequently provided that the ultrasonic tool is moved slowly along one of the two workpieces, with the result that the joining zone, in which the two workpieces are so strongly heated that they bond to one another, moves conjointly with the movement of the ultrasonic tool. The mechanical vibrations can, however, also extend into a region to the side of the joining zone. In order to prevent an already welded but still very warm region of the workpieces from becoming separated again because of the actions of the mechanical vibrations, the prior art discloses holding tools that hold the workpieces together immediately after the welding-together operation and continue to do so with the movement of the ultrasonic tool, with the result that the moving ultrasonic tool does not result in the previously welded portions of the workpieces coming apart again.

In practice, however, it has been found that the holding tools must be carried along continuously at a small distance from the ultrasonic tool in order to act on the workpieces in a respective portion which directly adjoins the joining zone. This readjustment of the holding tools is technically very complex and often requires individual adaptation to the workpieces to be welded.

SUMMARY

The disclosure herein is therefore based on an object of providing a simple option for welding two thermoplastic workpieces by ultrasound such that a weld seam can be produced between the two workpieces without destroying or mechanically severely impairing an already previously welded portion when a portion of the weld seam is being ultrasonically welded. In particular, the situation should be prevented in which the introduction of ultrasound at a joining zone between the two workpieces results in an adjacent welding point created shortly beforehand being removed and/or destroyed, this possibly being accompanied by the two workpieces coming apart.

The object is achieved according to a first aspect of the disclosure herein by a system disclosed herein. A system for welding two thermoplastic workpieces is therefore provided. The system comprises an ultrasonic tool, a support and a cooling unit. The ultrasonic tool is designed or configured to generate mechanical vibrations with a frequency of between 20 kHz and 100 kHz. A head of the ultrasonic tool is arranged facing the support in such a way that a receiving region for the workpieces is formed between the head of the ultrasonic tool and the support. The system is designed to clamp the workpieces together in the receiving region by the ultrasonic tool and the support when at least one attachment portion of the workpieces has a mutually opposite arrangement in the receiving region. The ultrasonic tool is designed to introduce the mechanical vibrations into the attachment portion of the workpieces in order to weld the workpieces in a joining zone. The cooling unit is designed to cool at least a part of the attachment portion of the workpieces and/or a cooling portion of the workpieces that directly adjoins the attachment portion using cooling liquid.

In order to arrange the workpieces in the receiving region, the one workpiece must first be arranged opposite the other workpiece, it being possible to arrange an auxiliary body, in particular configured as a thermoplastic auxiliary plate, between the two workpieces. This creates a sandwich arrangement of the two workpieces and the auxiliary body. In principle, however, it is also possible for the two workpieces to be arranged opposite one another directly and in direct physical contact. When reference is made below to the auxiliary plate, the intention is that this can therefore similarly mean the auxiliary body.

The oppositely arranged workpieces are brought into the receiving region, in particular with thermoplastic auxiliary plate arranged in between, in order then to be clamped in by the ultrasonic tool and the support. For this purpose, the ultrasonic tool can be moved in the direction of the support or else the support can be moved in the direction of the ultrasonic tool. It is also possible for the ultrasonic tool and the support to be moved toward one another. This creates the mechanical clamping connection between the ultrasonic tool, the workpieces and the support. The attachment portion of the workpieces comprises a respective part of the two workpieces and may furthermore comprise a part of the auxiliary plate. The attachment portion is arranged in the receiving region. The attachment portion may therefore be the same size as the receiving region. However, it is also possible for the attachment portion to be larger than the receiving region and thus extend laterally beyond the receiving region. The joining zone is preferably at least that part of the attachment portion into which the mechanical vibrations are introduced. This is preferably that region of the attachment portion that is directly between the ultrasonic tool and the support. The joining zone can therefore be displaced with respect to the workpieces when the workpieces are moved laterally relative to the ultrasonic tool and a new portion of the workpieces is thus continuously pushed into the receiving region. This results in the creation of a weld seam between the workpieces that can be continuously pushed out of the joining zone. In this case, the weld seam can still be in the attachment portion at least in certain portions, or, if it is laterally pushed out of the attachment portion of the workpieces, it can enter the cooling portion of the workpieces.

The cooling unit of the system is designed to cool at least a part of the cooling portion and/or at least a part of the attachment portion using cooling liquid. As mentioned above, the joining zone may form a part of the attachment portion. However, the joining zone is not necessarily the entire attachment portion. The cooling using cooling liquid may therefore also take place in a part of the attachment portion of the workpieces. By cooling at least a part of the attachment portion and/or of the cooling portion of the workpieces using cooling liquid, it can be ensured particularly simply and efficiently that the weld seam that has been pushed out of the joining zone is cooled down quickly and reliably. This increases the strength of the weld seam and of the resulting material bond between the workpieces. The mechanical vibrations occurring beyond the joining zone therefore do not result in the weld seam that has been pushed out of the joining zone coming apart and/or being mechanically weakened in such a way that only a poor bond between the workpieces is obtained. In addition, the cooling unit offers the advantage that it can be adapted particularly easily to different workpieces in order to cool the respective part of the attachment portion of the workpieces and/or the cooling portion of the workpieces using cooling liquid. This is because the cooling liquid used can be adapted particularly easily to a wide variety of geometrical configurations of the workpieces. This makes it possible to efficiently ensure a cooling effect, even in the case of workpieces with a very complex geometry.

Each of or one of the two thermoplastic workpieces may consist exclusively of thermoplastic material. However, this is not imperatively necessary. In fact, it may be provided that a thermoplastic workpiece comprises a thermoplastic base material in which fibers are embedded. It is therefore the intention that a thermoplastic workpiece can also be understood to be a fiber-reinforced, thermoplastic workpiece. The fibers for reinforcement may for example be formed from glass fibers, carbon fibers, aramid fibers and/or textile fibers. The fibers are preferably what are known as endless fibers. These fibers preferably have an average length of at least 5 cm, at least 10 cm or at least 20 cm. It may also be possible for the fibers to have an average length which corresponds to between 70% and 100% of an edge length of the respective workpiece. However, the fibers may also be formed by long fibers or short fibers. The fibers may be formed from glass fibers, carbon fibers, aramid fibers and/or textile fibers. Matrix material may be formed by PEKK, PEEK, LMPAEK, PEI, PPS and/or PA. A volume content of the fibers may be between 1% and 70%, preferably between 40% and 60%, of the respective workpiece.

In addition, it is possible to provide that at least one of thermoplastic workpieces may be provided with what is known as Lighting Strike Protection (LSP). This is preferably a copper ECF (Expanded Copper Foil) or copper PCF (Perforated Copper Foil). The LSP may be applied or have been applied to the surface of the respective workpiece during the production of the respective workpiece.

In particular, when at least one of thermoplastic workpieces consists of a fiber-reinforced, thermoplastic material, it was found that the fibers can be under preload, in particular tensile preload. This preload is also at least partially maintained when a weld seam that has been pushed out of the joining zone is formed. This part of the weld seam can therefore be under mechanical preload, in particular tensile preload, thereby possibly resulting in the weld seam coming apart if the weld seam, which is under tensile load in any case, is influenced by mechanical vibrations that are introduced into the joining zone in the immediate vicinity by the ultrasonic tool. The weld seam can be effectively prevented from coming apart if the strength of the weld seam is increased as quickly as possible and/or in the immediate vicinity of the joining zone after the weld seam has left the joining zone. This can be ensured by the cooling liquid, made available by the cooling unit, for cooling down the attachment region and thus for cooling down the weld seam. This is because the cooling unit directs the cooling liquid to at least a part of the attachment portion of the workpieces and/or to a cooling portion of the workpieces.

The explanations above apply analogously if both thermoplastic workpieces are formed by fiber-reinforced, thermoplastic material. However, it is also possible for the respective workpiece to be formed only partially by thermoplastic material and/or only partially by fiber-reinforced, thermoplastic material. This is because in this case it is relevant that thermoplastic proportion and/or the fiber-reinforced, thermoplastic proportion of the respective workpiece is used to form an attachment portion with the respective other workpiece, which attachment portion can be arranged in the receiving region in order to subsequently weld the workpieces by ultrasound.

An advantageous embodiment of the system is distinguished in that an auxiliary body is arranged in the attachment region between the first workpiece and the second workpiece when the workpieces are to be clamped together in the receiving region, wherein the two workpieces can be welded by way of the auxiliary body in the joining zone. The auxiliary body may have any desired shape. The auxiliary body is preferably in the form of a thermoplastic auxiliary body. The auxiliary body may therefore be formed completely or at least partially from thermoplastic material. The auxiliary body is preferably in the form of a thermoplastic auxiliary plate. When reference is made below to the auxiliary plate, this can therefore similarly mean the auxiliary body, in particular in any desired shape. At least in the attachment portion, thermoplastic auxiliary plate may be arranged between the first and the second workpiece. This results in a sandwich arrangement. The sandwich arrangement may be arranged in the receiving region, with the result that the two workpieces and the auxiliary plate arranged in between can be clamped together in the receiving region by the ultrasonic tool and the support in order to introduce mechanical vibrations into the attachment portion of the workpieces by the ultrasonic tool and to weld the workpieces at least partially by way of the auxiliary plate in the joining zone. This is because the auxiliary plate can thus likewise be in the joining zone. The auxiliary plate is produced completely from a thermoplastic material or for example from a fiber-reinforced, thermoplastic material. Because of the introduction of the mechanical vibrations, thermoplastic material proportion causes heating to occur between each of the workpieces and the auxiliary plate, specifically on account of molecular and/or interface friction. As a result, the auxiliary plate is welded to each of the two workpieces, and therefore the auxiliary plate functions as a bonding means between the two workpieces. It can therefore also be the that the two workpieces are welded or can be welded by way of the auxiliary plate. It has been found to be advantageous if the auxiliary plate has a lower stiffness than each of the two workpieces. This makes it possible to obtain an especially resistant and at the same time strong bond between the workpieces on account of the welding. In addition, it has proven to be advantageous if the auxiliary plate is arranged at least substantially only along the planned weld seam between the workpieces such that, on account of the shape of the auxiliary plate, a determination can at least also be made as to where the welding between the auxiliary plate and the two workpieces occurs.

Another advantageous embodiment of the method is distinguished in that the cooling liquid is water or at least comprises water. For example, at least 70% of the cooling liquid may be formed by water. The cooling liquid may therefore also be largely based on water. The use of water as cooling liquid has proven to be particularly advantageous in practice. The heating that occurs in the joining zone on account of molecular and/or interface friction results in a temperature in the joining zone that is greater than 100° C., preferably greater than 140° C. Because of the stated temperature in the joining zone, it can be ensured that cooling liquid that penetrates in the direction of the joining zone evaporates before it reaches the joining zone, thus preventing the cooling liquid from actually penetrating into the joining zone. The joining zone is therefore free of cooling liquid.

Another advantageous embodiment of the system is distinguished in that the cooling unit is designed to convey the cooling liquid to the attachment portion and/or cooling portion, with the result that the cooling liquid that has been conveyed to that point flows over the attachment portion and/or cooling portion of the workpieces in order to cool the workpieces. The workpieces are cooled down in the immediate vicinity of the joining zone in that the cooling liquid flows onto the attachment portion and/or cooling portion of the workpieces. This makes it possible to ensure that a weld seam that has been pushed out of the joining zone is cooled down quickly and/or in the immediate vicinity of the joining zone. This ensures that the weld seam that has been pushed out of the joining zone has the appropriate strength to remain free of destruction and/or without significant adverse effects in the event of mechanical vibrations, even if mechanical vibrations of this type can be passed on from the joining zone via the material of the workpieces. It can be particularly easily ensured that the cooling liquid has a temperature which is in a desired and/or predetermined temperature range in that the cooling liquid is conveyed by the cooling unit. This is because, in particular, the cooling liquid may have been brought to a desired temperature before it is conveyed, and therefore the cooling liquid flows to the attachment portion and/or cooling portion of the workpieces at a previously known temperature. This makes it possible to particularly reliably and easily predict how the workpiece will be cooled.

Another advantageous embodiment of the system is distinguished in that the cooling unit has a liquid tank, a pump and a pipeline strand, wherein the cooling unit is designed to convey cooling liquid from the liquid tank through the pipeline strand to a line end of the pipeline strand by the pump, with the result that the cooling liquid leaving the line end reaches the attachment portion and/or cooling portion of the workpieces. In particular, the use of the pipeline strand offers the option of placing the line end at a desired location such that the cooling liquid reaches the attachment portion and/or cooling portion of the workpieces. The arrangement of the line end can therefore be particularly easily and individually adapted to the respective workpieces to be welded. This makes it especially possible to adapt the system to the workpieces to be welded. In particular, particularly small workpieces or particularly large workpieces can also be welded to one another. This is because the size of the workpieces to be welded only has a small influence at most in this embodiment of the system. Furthermore, it is possible for the liquid tank to be arranged at a distance from the ultrasonic tool. This is because it is possible that only the pipeline strand extends up close to the ultrasonic tool. Therefore, the line end of the pipeline strand may be arranged laterally next to the ultrasonic tool, preferably at a distance of less than 10 cm.

An advantageous embodiment of the system is distinguished in that the support is formed by an anvil, a table or a frame. The support may preferably be formed by a fixed and/or stable body. This offers the advantage that the workpieces, preferably with the auxiliary plate arranged in between, can be arranged between the support and the ultrasonic tool in the receiving region such that the workpieces can be clamped in, preferably with the auxiliary plate arranged in between. In this respect, forces can be exerted by the ultrasonic tool in the direction of the support, or vice versa, and therefore a clamping force acts on the workpieces. The clamping force that acts during the welding operation ensures that a material bond is created between thermoplastic material of the workpieces and/or thermoplastic material of the auxiliary plate. On the basis of the explanation above, however, it is also clear that it is indeed advantageous if at least one of the workpieces is arranged directly on the support in order to clamp the workpieces together. However, it is not imperatively necessary for one of the two workpieces to be arranged directly on the support.

Another advantageous embodiment of the system is distinguished in that the cooling unit has a liquid container, the interior space of which is at least partially filled with cooling liquid, wherein the liquid container is arranged on the support and/or the base of the liquid container is at least partially formed by the support, wherein the head of the ultrasonic tool is immersed into the cooling liquid in the interior space of the liquid container with the result that the receiving space is within the interior space, filled with cooling liquid, of the liquid container. The workpieces must therefore be brought into the liquid in the interior space of the liquid container in order to be arranged in the receiving space. The workpieces arranged there may thus be welded under liquid or under water in the joining zone. Strictly speaking, however, the welding as such does not take place in the cooling liquid, because the cooling liquid does not penetrate into the joining zone but evaporates just before the joining zone because of the heating of the workpieces. However, the area around the joining zone is cooled readily and quickly using cooling liquid, in particular using water. This makes it possible to ensure particularly simple and efficient cooling of at least a part of the attachment region and/or of the cooling region of the workpieces. The liquid container may be designed in the manner of a shell. The shell may be arranged on the support and/or the base of the shell may be at least partially formed by the support. However, even if the shell is arranged on the support, it can be ensured that the workpieces, in particular with the intermediate plate arranged in between, are clamped together by generating a clamping force between the ultrasonic tool and the support, which clamping force also acts on the aforementioned workpieces by virtue of the arrangement. In this case, although the clamping force also acts on the shell, it has no adverse effects. The liquid container, in particular in the form of a shell, is preferably made of metal. The support may likewise be made of metal. This effectively prevents welding occurring between one of the workpieces and the liquid container and/or welding occurring between the workpiece and the support.

An advantageous embodiment of the system is distinguished in that the ultrasonic tool is designed in such a way that the mechanical vibrations generated by the ultrasonic tool have an amplitude and/or frequency that have/has the effect that the mechanical vibrations act at least substantially on the workpieces, and here particularly preferably substantially on the interfaces of the workpieces. In addition, the ultrasonic tool is preferably designed in such a way that the mechanical vibrations act at least substantially only in the receiving region. The joining zone is in the receiving region.

Another advantageous embodiment of the system is distinguished in that the system has a first handling unit, to which the ultrasonic tool is attached, wherein the system is designed to control the first handling unit in such a way as to move the ultrasonic tool along a predetermined movement path relative to the support and/or to the workpieces. Thus, for example, it may be provided that the support supports the workpieces over a relatively large area. In this case, the first handling unit may be controlled in such a way that the ultrasonic tool is guided over the workpieces along the predetermined movement path, with the result that the joining zone migrates or is conjointly moved with the movement of the ultrasonic tool. The cooling liquid has the effect that the weld seam generated by the movement of the joining zone is cooled down in the immediate vicinity of the joining zone. This can effectively prevent the mechanical vibrations caused by the moved ultrasonic tool from affecting a weld seam that has been moved out of the joining zone in such a way that the weld seam is destroyed and/or mechanically adversely affected thereby. The first handling unit may comprise and/or be formed by a robot with a controllable robot arm. The ultrasonic tool may thus be arranged on an arm end of the robot arm, for example. The robot may also be controlled in such a way that the robot arm moves the head of the ultrasonic tool over one of the workpieces along the predetermined movement path, and in the process uninterruptedly and/or continuously clamps the workpieces together.

An advantageous embodiment of the system is distinguished in that the system has a drive which is coupled to the support in such a way as to move the support along a predetermined drive path, in particular relative to the ultrasonic tool. The drive may be in the form of a linear drive, by way of which the support can be moved in a plane. The linear drive may be in the form of a multiaxial linear drive, with the result that the support can be moved in the plane along any desired, in particular curved, drive path. The support is preferably designed to hold the workpieces, with the result that the workpieces are moved along the predetermined drive path with the support while being held by the support. The ultrasonic tool may be arranged in a stationary manner. The movement of the support, in particular together with the workpieces, results in a relative movement between the support or the workpieces and the ultrasonic tool. This makes it possible to obtain a weld seam between the workpieces.

Another advantageous embodiment of the system is distinguished in that the system has a holding unit, which is designed to hold the workpieces and to arrange the workpieces such that the workpieces are mutually oppositely arranged in the attachment portion and the attachment portion of the workpieces is arranged in the receiving region. The auxiliary plate may be arranged between the workpieces. It may likewise be held and arranged with the workpieces by the holding unit. In addition, the system preferably comprises a handling unit, or the first handling unit, to which the ultrasonic tool is attached. The system is also preferably designed to control the first handling unit in such a way as to move the ultrasonic tool along the workpieces along a predetermined movement path. In addition, it is preferably provided that the system has a second handling unit, to which the support is attached, wherein the system is designed to control the second handling unit in such a way as to move the support parallel to the ultrasonic tool. During the movement of the ultrasonic tool and the support by the first and the second handling unit, respectively, the workpieces are continuously clamped in between the ultrasonic tool and the support. The ultrasonic tool is moved parallel to the support, with the result that a weld seam is created between the workpieces or between the auxiliary plate and the workpieces along the predetermined movement path. This should also be construed to mean a welding of the workpieces. The workpieces are thus welded along the movement path. The holding unit may hold the workpieces stationary. Consequently, for the purpose of welding the workpieces, the workpieces do not move. This is advantageous, in particular when the workpieces are very large.

According to a second aspect of the disclosure herein, the object stated at the outset is achieved by a method disclosed herein. A method for welding two thermoplastic workpieces is therefore provided, wherein the method comprises the following steps:

a) arranging an attachment portion of the mutually opposite workpieces in a receiving region between a head of an ultrasonic tool and a support, wherein the ultrasonic tool is designed to generate mechanical vibrations with a frequency of between 20 kHz and 100 kHz;

b) clamping together the workpieces, which are opposite one another in the attachment portion, by the ultrasonic tool and the support;

c) introducing mechanical vibrations into the attachment portion of the workpieces by the ultrasonic tool, with the result that the workpieces are welded in a joining zone; and d) cooling at least a part of the attachment portion of the workpieces and/or a cooling portion of the workpieces that directly adjoins the attachment portion by a cooling unit using a cooling liquid.

In terms of the method, reference is made to the above explanations, preferred features, effects and/or advantages as have been explained similarly for the system according to the first aspect of the disclosure herein and/or one of the associated embodiments. The same applies to each of the advantageous embodiments of the method that are specified below. Repetitions are therefore avoided.

An advantageous embodiment of the method is distinguished in that, in step a), a thermoplastic auxiliary plate is arranged in the attachment portion between the workpieces, and wherein, in step c), the two workpieces are welded in the joining zone by way of the auxiliary plate.

Another advantageous embodiment of the method is distinguished in that the cooling liquid is water or at least comprises water.

Another advantageous embodiment of the method is distinguished in that steps b), c) and d) are carried out at the same time.

Another advantageous embodiment of the method is distinguished in that, in step c), the workpieces are heated in a joining zone to a temperature of at least 150° C., which temperature is at least 20° C. higher than a boiling point of the cooling liquid. The cooling liquid can therefore be evaporated in the immediate vicinity of the joining zone. This holds true in particular when the cooling liquid is water.

Another advantageous embodiment of the method is distinguished in that, in step d), the cooling liquid is conveyed to the attachment portion and/or cooling portion by the cooling unit, with the result that the cooling liquid that has been conveyed to that point flows over the attachment portion and/or cooling portion of the workpieces in order to cool the workpieces.

A further advantageous embodiment of the method is characterized in that the cooling unit has a liquid tank, a pump and a pipeline strand, wherein, in step d), the cooling liquid is conveyed from the liquid tank through the pipeline strand to a line end of the pipeline strand by the pump, with the result that the cooling liquid leaving the line end reaches the attachment portion and/or cooling portion of the workpieces.

Another advantageous embodiment of the method is distinguished in that the cooling unit has a liquid container, the interior space of which is at least partially filled with cooling liquid, wherein the liquid container is arranged on the support and/or the base of the liquid container is at least partially formed by the support, wherein, during step c), the head of the ultrasonic tool is immersed into the cooling liquid in the interior space of the liquid container with the result that the receiving space is within the interior space, filled with cooling liquid, of the liquid container.

Another advantageous embodiment of the method is distinguished in that, during step c), the ultrasonic tool and the support are moved relative to one another by a first handling unit and/or a drive.

BRIEF DESCRIPTION OF THE DRAWINGS

Further features, advantages and possible uses of the disclosure herein emerge from the following description of the example embodiments and from the figures. Here, all of the features described and/or illustrated in the figures form the subject matter of the disclosure herein individually and in any desired combination, even independently of the combination of the features in the individual claims or the back-references thereof. Furthermore, in the figures, the same reference signs are used for identical or similar objects.

DETAILED DESCRIPTION

Figure 1:
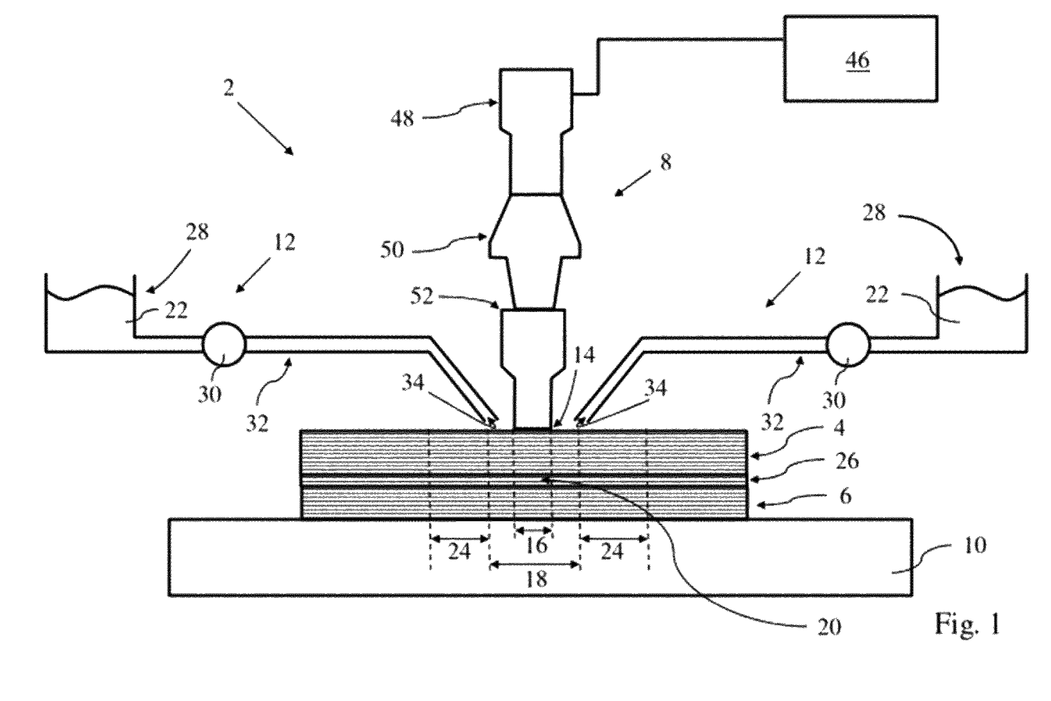
FIGS. 1 through 5 each show a schematic illustration of an advantageous embodiment of the system.

FIG. 1 schematically illustrates an advantageous embodiment of the system 2. The system 2 is used to weld two thermoplastic workpieces 4, 6. The system 2 can therefore be used to weld the first workpiece 4 to the second workpiece 6. Each of the two workpieces 4, 6 is a thermoplastic workpiece. In this respect, each of the two workpieces 4, 6 may consist of thermoplastic material or at least comprise thermoplastic material. Each of the two workpieces 4, 6 may comprise reinforcing fibers, which are embedded in thermoplastic material of the respective workpiece 4, 6. When reference is made below to welding of the two workpieces 4, 6, this can be understood to mean direct welding of thermoplastic material of the first workpiece 4 to thermoplastic material of the second workpiece 6. The welding of the two workpieces 4, 6 may, however, also be understood to mean that the two workpieces 4, 6 are welded by way of further thermoplastic material, which is arranged between the two workpieces 4, 6 before the welding operation. Thus, for example, a thermoplastic auxiliary plate 26 may be arranged between the first workpiece 4 and the second workpiece 6 before the two workpieces 4, 6 are actually welded by way of thermoplastic material of the auxiliary plate 26. The auxiliary thermoplastic material arranged between the two workpieces 4, 6 may also be understood to mean what is known as an energy directing element or what is known as an "energy director". The two workpieces 4, 6 are welded by ultrasonic welding. The welding may thus also be understood to mean ultrasonic welding. The welding is achieved by virtue of mechanical vibrations with a frequency of between 20 kHz and 100 kHz, which results in heating of thermoplastic material between the workpieces 4, 6 or between the auxiliary plate 26 and the workpieces 4, 6 on account of molecular and/or interface friction, which heating reaches a temperature at which thermoplastic material softens and/or melts. However, it is preferably provided that the heating is restricted to a temperature at which thermoplastic material, the two workpieces 4, 6 and preferably also thermoplastic material of the auxiliary plate 26 transitions into a plastic flow, but without thermoplastic material melting down. The flow is sufficient to create a material bond between thermoplastic material of the auxiliary plate 26 and thermoplastic material of each of the two workpieces 4, 6. Should the welding take place directly between the two workpieces 4, 6, the plastic flow of thermoplastic material of the two workpieces 4, 6 results in a material bond between the two workpieces 4, 6.

In order to generate the mechanical vibrations for welding the two thermoplastic workpieces 4, 6, the system 2 comprises an ultrasonic tool 8. A head of the ultrasonic tool 8 presses directly on one of the two workpieces 4, 6 in order to transmit the mechanical vibrations and to generate the clamping force. The ultrasonic tool 8 may have what is known as a converter 48, a booster 50 and a sonotrode 52. The converter 48, the booster 50 and the sonotrode 52 are preferably arranged one behind the other and mechanically coupled to one another in a mechanical series circuit. The converter 48 may be designed to convert an electrical signal into mechanical vibrations. Mechanical vibrations can therefore be generated by the converter 48. For this purpose, the converter 48 may have piezo elements, for example, which can be actuated by an electrical signal, this resulting in mechanical vibrations insofar as the electrical signal is an alternating signal. The booster 50 is preferably designed to change the amplitude of the mechanical vibrations generated by the converter 48 in terms of the amplitude level and/or frequency. The booster 50 can thus be designed in such a way, for example, that the booster 50 can be made to mechanically vibrate only in the frequency range of between 20 kHz and 100 kHz. The sonotrode 52 is mechanically coupled to the booster 50. The sonotrode 52 has a head 14, which is designed to be brought in direct contact with one of the two workpieces 4, 6 in order to accomplish the welding. The head 14 of the sonotrode 52 may also form the head 14 of the ultrasonic tool 8. In order to set the ultrasonic tool 8 in mechanical vibration, the ultrasonic tool 8 may be coupled via an electrical connecting line to a control unit 46, which is designed to generate and transmit an electrical signal to the ultrasonic tool 8 via the connecting line, such that the ultrasonic tool 8 is set in mechanical vibration by virtue of the electrical signal. The control unit 46 does not form part of the system 2. The ultrasonic tool 8 is designed to generate mechanical vibrations with a frequency of between 20 kHz and 100 kHz, preferably of between 20 kHz and 40 kHz.

The system 2 furthermore has a support 10. The support 10 is illustrated schematically and by way of example in FIG. 1. The support 10 may be designed in the manner of an anvil or as a table. The support 10 may, however, also be formed by a frame or another solid body. The support 10 is often significantly larger than the sonotrode 52. This is because the support 10 may also be designed to hold and/or attach the workpieces 4, 6 in a supporting manner. In particular, the support 10 may be designed to detachably hold the workpieces 4, 6, although this is not illustrated schematically in FIG. 1.

The head 14 of the ultrasonic tool 8 is arranged facing the support 10 in such a way that a receiving region 16 for the workpieces 4, 6 is formed between the head 14 of the ultrasonic tool 8 and the support 10. The workpieces 4, 6 may thus be arranged between the head 14 of the ultrasonic tool 8 and the support 10, with the result that an attachment portion 18 of the two workpieces 4, 6 is arranged between the head 14 of the ultrasonic tool 8 and the support 10. In this case, at least a part of the attachment portion 18 of the two workpieces 4, 6 is arranged in the receiving region 16 between the head 14 of the ultrasonic tool 8 and the support 10. The system 2 is furthermore designed to clamp the workpieces 4, 6 together in the receiving region 16 by the ultrasonic tool 8 and the support 10. For this purpose, the ultrasonic tool 8 can be attached to a handling unit 42, as can be seen schematically in FIG. 4. The head 14 of the ultrasonic tool 8 can press on one of the two workpieces 4, 6 by the handling unit 42, with the result that the two workpieces 4, 6 are clamped in between the head 14 of the ultrasonic tool 8 and the support 10. The receiving region 16 is preferably determined by the contact surface area between the head 14 of the ultrasonic tool 8 and the longitudinal axial direction of the ultrasonic tool 8. This is because the ultrasonic tool 8 is preferably designed to introduce the mechanical vibrations into the clamped-together workpieces 4, 6 in the longitudinal axial direction of the ultrasonic tool 8. This is preferably performed over the entire contact surface area between the head 14 and the one of the two workpieces 4, 6. Outside the receiving region 16, the mechanical vibrations will only occur to a lesser degree, and therefore the workpieces 4, 6 can be welded in a targeted manner in the receiving region 16. The ultrasonic tool 8 is therefore designed to introduce the mechanical vibrations into that part of the attachment portion 18 of the workpieces 4, 6 that overlaps with the receiving region 16, in order to weld the workpieces 4, 6 in a joining zone 20. The joining zone 20 is preferably within the receiving region 16. If the two workpieces 4, 6 are welded by way of the auxiliary plate 26 arranged between the two workpieces 4, 6, the respective joining zone 20 will be on the boundary layers between the auxiliary plate 26 and the workpieces 4, 6 within the receiving region 16. This is because the molecular and interface friction on account of the mechanical vibrations occurs precisely at the transition regions from the auxiliary plate 26 to the respective workpiece 4, 6, this resulting in the desired heating of thermoplastic material of the auxiliary plate 26 or of the respective workpiece 4, 6. The ultrasonic welding therefore takes place in the joining zone 20.

The ultrasonic tool may be moved along a predetermined movement path relative to the support 10 and/or the workpiece 4, 6. The receiving region 16 and the joining zone 20 are displaced synchronously with the movement of the ultrasonic tool 8. That part of the welded workpieces 4, 6 that has been pushed out of the receiving region 16 may, however, still be very warm at the weld seam. In order to prevent this weld seam, which is still very warm, from being destroyed and/or mechanically adversely affected because of the outwardly conveyed mechanical vibrations, the system 2 has a cooling unit 12. The cooling unit 12 is designed to cool at least a part of the attachment portion 18 of the workpieces 4, 6 and/or a cooling portion 24 of the workpieces 4, 6 that directly adjoins the attachment portion 18 using cooling liquid 22. That part of the attachment portion 18 that can be cooled using cooling liquid 22 is preferably arranged on the outside around the receiving region 16, in particular annularly. The cooling portion 24 may in turn be arranged on the outside of the attachment portion 18, specifically preferably also annularly.

FIG. 1 illustrates an advantageous embodiment of the cooling unit 12. In this respect, the cooling unit 12 may have, for example, a liquid tank 28, a pump 30 and a pipeline strand 32. The pipeline strand 32 preferably extends from the liquid tank 28 to a line end 34, the pump 30 being integrated in the pipeline strand 32. Cooling liquid 22 can thus be conveyed from the liquid container 36 to the line end 34 by the pump 30. The line end 34 is preferably arranged in such a way that the cooling liquid 22 leaving the line end 34 reaches the attachment portion 18 and/or cooling portion 24 of the workpieces 4, 6. The system 2 may also have a plurality of cooling units 12. This is illustrated by way of example in FIG. 1. That part of the attachment portion 18 which is on the outside of the receiving region 16 is cooled down particularly quickly and efficiently by the cooling liquid 22. In addition, the cooling portion 24 of the workpieces 4, 6 is also efficiently cooled down by the cooling liquid 22.

If the sonotrode 52 is used to produce a weld seam, such that the sonotrode 52 is moved along the predetermined movement path relative to the support 10 and/or the workpieces 4, 6, the weld seam that is continuously pushed out of the joining zone 20 in the process is quickly and efficiently cooled down by virtue of the cooling using the cooling liquid 22. Mechanical vibrations which are transmitted from the receiving region 16 outward into the aforementioned part of the attachment portion 18 or even into the cooling portion 24 therefore cannot result in destruction of the aforementioned weld seam. This is because the weld seam solidifies and thus increases in strength as a result of being cooled down. This higher strength prevents the aforementioned mechanical vibrations from causing destruction of and/or having an adverse mechanical effect on the weld seam.

Figure 3:
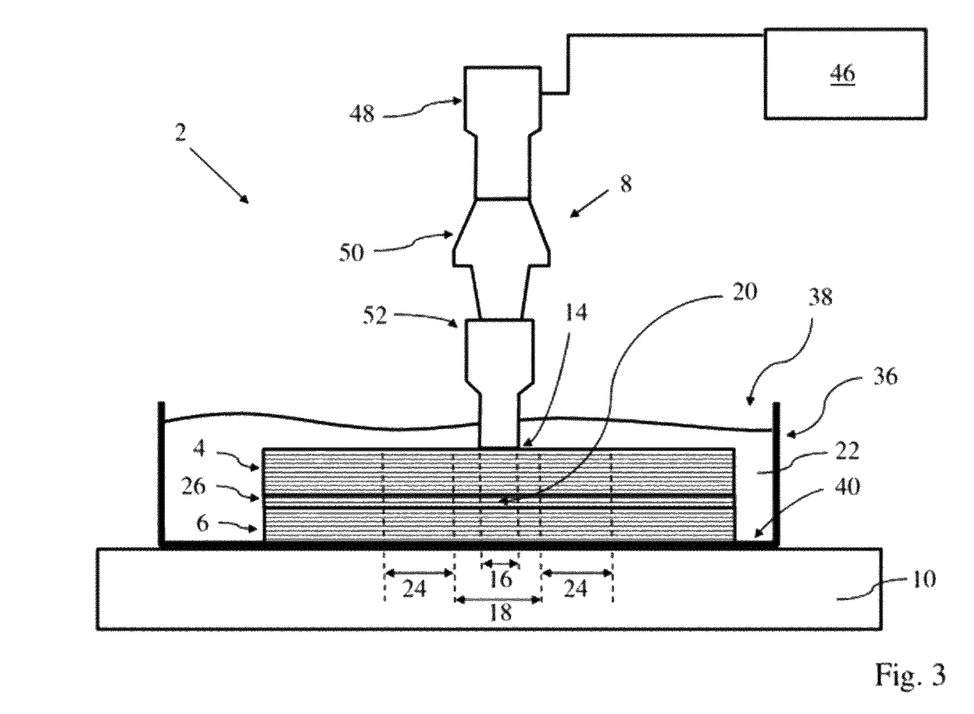

FIG. 3 schematically illustrates a further advantageous embodiment of the system 2. Except for the support 10, the system 2 corresponds to the system 2 explained above in conjunction with FIG. 1. Similar reference is therefore made to the corresponding explanations.

Figure 2:
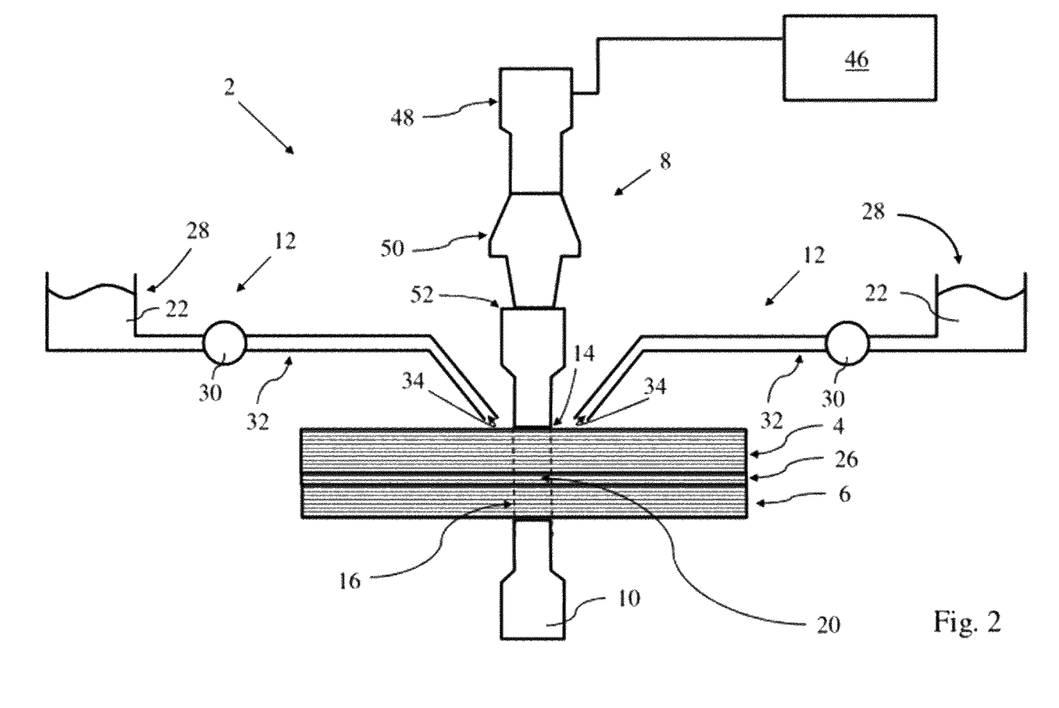

The support 10 for the system 2 illustrated in FIG. 2 has a smaller configuration than the support 10 as was used before. In particular, the support 10 may have a base area by way of which the support 10 presses against the second workpiece 6. The sonotrode 52 may press against the first workpiece 4 with the same base area. The support 10 and the sonotrode 52 may be arranged opposite one another, with the result that the portion that is in line between the base areas determines the receiving region 16.

FIG. 3 schematically illustrates a further advantageous embodiment of the system 2. Except for the cooling unit 12, the system 2 corresponds to the system 2 explained above in conjunction with FIG. 1. Similar reference is therefore made to the corresponding explanations.

The cooling unit 12 of the system 2, as is illustrated schematically in FIG. 3, comprises a liquid container 36, the interior space 38 of which is at least partially filled with the cooling liquid 22. The liquid container 36 is arranged on the support 10. In addition, the head 14 of the ultrasonic tool 8 is immersed in the cooling liquid 22 in the interior space 38 of the liquid container 36 with the result that the receiving region 16 is within the interior space 38, filled with cooling liquid 22, of the liquid container 36. The workpieces 4, 6 and the auxiliary plate 26, which is preferably arranged in between, are likewise immersed in the cooling liquid 22, such that the attachment portion 18 and the cooling portions 24 are within the interior space 38, filled with cooling liquid 22, of the liquid container 36. In other words, it is preferably provided that the receiving region 16 and also the attachment portion 18 and the cooling portion 24 are below the surface of the cooling liquid 22. The base 40 of the liquid container 36 is arranged between the support 10 and the workpieces 4, 6. However, this is not disadvantageous because the workpieces 4, 6 and preferably also thermoplastic auxiliary plate 26 arranged in between may be clamped in between the ultrasonic tool 8 and the support 10 in the receiving region 16. In an embodiment variant not illustrated in FIG. 3, the base 40 of the liquid container 36 may be formed by the support 10.

If mechanical vibrations are introduced into the receiving region 16 by the ultrasonic tool 8, the joining zone 20 is created between the clamped-in workpieces 4, 6. The cooling liquid 22 evaporates because of the strong heating in the joining zone 20 or evaporates before it reaches the joining zone 20, with the result that the welding in the joining zone 20 is not adversely affected by the cooling liquid 22. The cooling liquid 22 is preferably water or at least comprises water. The cooling liquid 22 may be formed on the basis of water with additional substances, for example. In the joining zone 20, a temperature that is often greater than 150° C. is produced on account of the heating. This causes the cooling liquid 22 to evaporate, in particular if the cooling liquid 22 is water or is based on water.

As that part of the attachment portion 18 that is arranged around the joining zone 20, and the cooling portion 24, are arranged in the cooling liquid 22, particularly rapid and efficient cooling-down will also take place here. This in turn results in a weld seam that has been pushed out of the joining zone 20 cooling down particularly efficiently and quickly, and therefore the weld seam is protected against mechanical effects or mechanical destruction caused by mechanical vibrations.

Figure 4:
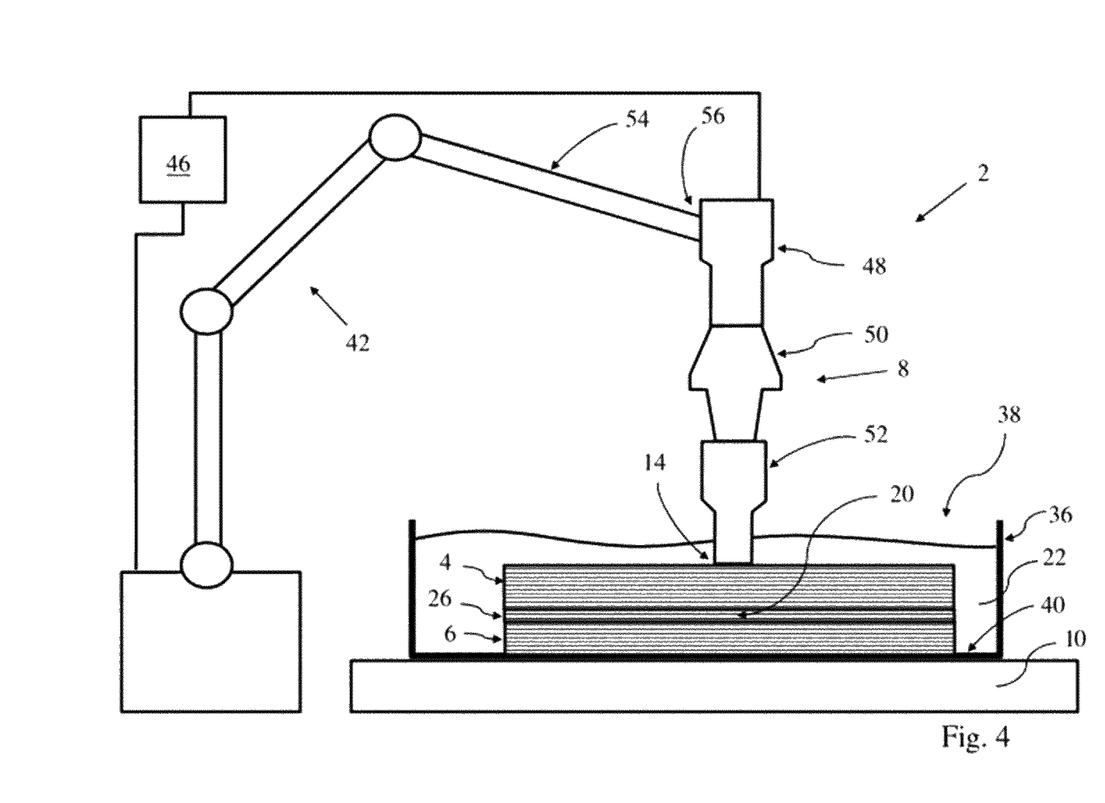

FIG. 4 illustrates a further advantageous embodiment of the system 2. The system 2 corresponds at least substantially to the system 2 explained in conjunction with FIG. 3. However, the system 2 from FIG. 4 comprises a first handling unit 42, to which the ultrasonic tool 8 is attached. The first handling unit 42 may be in the form of a robot with a robot arm 54. The ultrasonic tool 8 is attached to an arm end 56 of the robot arm 54. The first handling unit 42 is designed to spatially move the ultrasonic tool 8. Furthermore, the ultrasonic tool 8 can press on the workpieces 4, 6 by the first handling unit 42 in such a way that the workpieces 4, 6, and in particular also the auxiliary plate 26 arranged in between, are clamped in between the head 14 of the ultrasonic tool 8 and the support 10. In addition, the system 2 is designed to control the first handling unit 42 in such a way as to move the ultrasonic tool 8 along a predetermined movement path relative to the support 10 and the workpieces 4, 6. For this purpose, the first handling unit 42 may be coupled to the control unit 46 via a control line. Consequently, the system 2 can control the first handling unit 42 by the control unit 46 in such a way as to move the ultrasonic tool 8 along the predetermined movement path. In the process, contact between the head 14 and the workpieces 4, 6 is maintained. During the movement of the ultrasonic tool 8, the workpieces 4, 6 thus continue to be pressed together. The movement of the ultrasonic tool 8 creates a weld seam for joining the workpieces 4, 6, in particular using the auxiliary plate 26. In this case, the workpieces 4, 6 can be detachably held directly or indirectly on the support 10 in order to prevent the workpieces 4, 6 from slipping when the ultrasonic tool 8 is moving.

Figure 5:
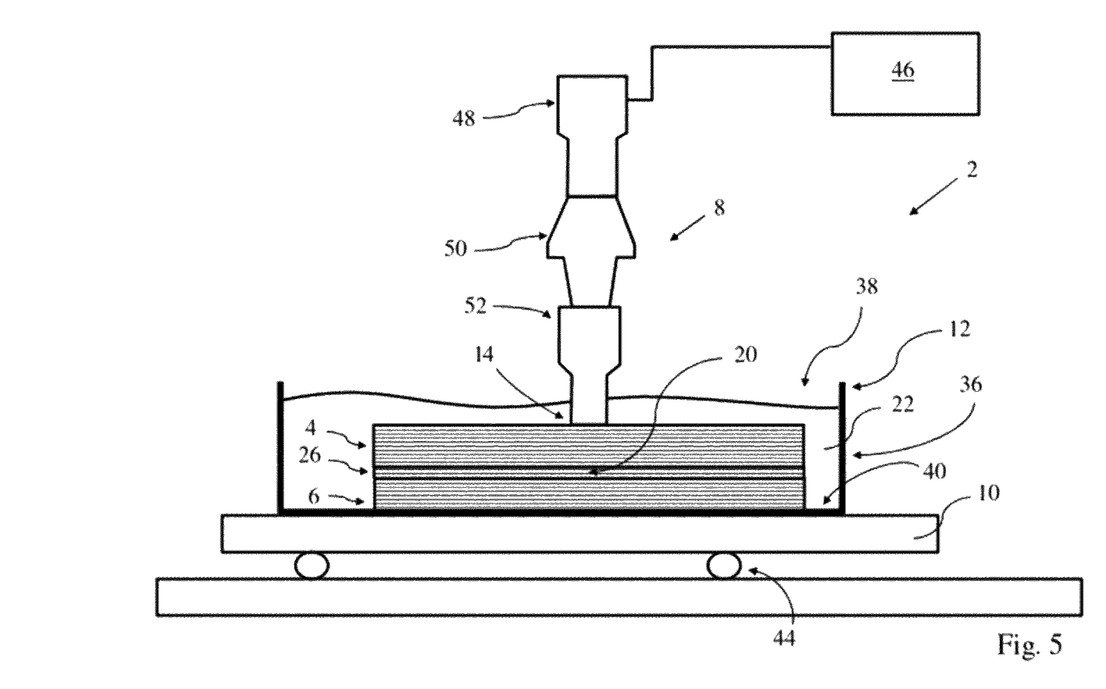

FIG. 5 illustrates a further advantageous embodiment of the system 2. The system 2 illustrated in FIG. 5 substantially corresponds to the system 2, as has been explained in conjunction with FIG. 3. Similar reference is made to the corresponding explanations. The system 2 illustrated in FIG. 5, however, has a drive 44 which is coupled to the support 10 in such a way as to move the support 10 along a predetermined drive path, preferably relative to the ultrasonic tool 8. The drive 44 is preferably in the form of a linear drive 44. The support 10 can thus be moved for example in a plane by the linear drive 44. The drive 44 may be controlled by the control unit 46. For this purpose, the control unit 46 may be coupled to the drive 44 via a signal control line (not illustrated). While the support 10 is moved by the drive 44, the ultrasonic tool 8 may be arranged in a stationary manner and/or held stationary. For this purpose, a holding device (not illustrated) may be provided, which holds the ultrasonic tool 8 stationary. In addition, it may be provided that the workpieces 4, 6 are held directly or indirectly by the support 10 and/or in the liquid container 36 in order to prevent the workpieces 4, 6 from slipping during the movement of the support 10 by the drive 44. The movement of the support 10 by the drive 44 therefore also results in an analogous movement of the workpieces 4, 6, specifically preferably relative to the ultrasonic tool 8. This makes it possible to obtain a weld seam between the workpieces 4, 6, in particular by way of the auxiliary plate 26.

Figure 6:
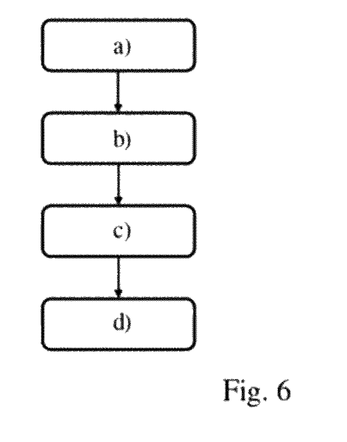
FIG. 6 shows a schematic illustration of a flow diagram of an advantageous embodiment of the method.

FIG. 6 schematically illustrates a flow diagram of an advantageous embodiment of the method. The method is used to weld thermoplastic workpieces 4, 6. In this respect, the method comprises the following steps a) to d):

a) arranging an attachment portion 18 of the mutually opposite workpieces 4, 6 and a receiving region 16 between a head 14 of an ultrasonic tool 8 and a support 10, wherein the ultrasonic tool 8 is designed to generate mechanical vibrations with a frequency of between 20 kHz and 100 kHz;

b) clamping together the workpieces 4, 6, which are opposite one another in the attachment portion 18, by the ultrasonic tool 8 and the support 10;

c) introducing mechanical vibrations into the attachment portion 18 of the workpieces 4, 6 by the ultrasonic tool 8, with the result that the workpieces 4, 6 are welded in a joining zone 20;

d) cooling at least a part of the attachment portion 18 of the workpieces 4, 6 and/or a cooling portion 24 of the workpieces 4, 6 that directly adjoins the attachment portion 18 by a cooling unit 12 using a cooling liquid 22.

The method discussed achieves similar advantages and/or effects to those that have already been explained in conjunction with the system 2. For the method, similar reference is also made to the advantageous explanations, preferred features, effects and/or advantages as have been explained in conjunction with the system 2.

Steps b), c) and d) are preferably carried out at the same time. As a result, the workpieces 4, 6 are welded in the joining zone 20, while the workpieces 4, 6 are clamped together in the attachment portion 18 by the ultrasonic tool 8 and the support 10. Furthermore, the cooling down by the cooling liquid 22 is performed at the same time.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "having", "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for welding two thermoplastic workpieces, comprising:
   an ultrasonic tool;
   a support; and
   a cooling unit comprising a liquid tank, a pump, and a pipeline strand;
   wherein the ultrasonic tool is configured to generate mechanical vibrations with a frequency of between 20 kHz and 100 kHz,
   wherein a head of the ultrasonic tool faces the support such that a receiving region for the workpieces is formed between the head of the ultrasonic tool and the support;
   wherein the system is configured to clamp the workpieces together in the receiving region by the ultrasonic tool and the support when at least one attachment portion of the workpieces has a mutually opposite arrangement in the receiving region;
   wherein the ultrasonic tool is configured to introduce mechanical vibrations into the attachment portion of the workpieces to weld the workpieces in a joining zone;
   wherein the cooling unit is configured to cool at least a part of the attachment portion of the workpieces and/or a cooling portion of the workpieces that directly adjoins the attachment portion using cooling liquid; and
   wherein the cooling unit is configured to convey cooling liquid from the liquid tank through the pipeline strand to a line end of the pipeline strand by the pump such that the cooling liquid leaving the line end reaches the attachment portion and/or cooling portion of the workpieces.

2. The system of claim 1, wherein an auxiliary body in the attachment portion between the workpieces when the workpieces are to be clamped together in the receiving region, wherein the two workpieces can be welded by the auxiliary body in the joining zone.

3. The system of claim 1, wherein the cooling liquid is water or at least comprises water.

4. The system of claim 1, wherein the cooling unit has a liquid container, the interior space of which is at least partially filled with cooling liquid, wherein the liquid container is on the support and or a base of the liquid container is at least partially formed by the support, wherein the head of the ultrasonic tool is immersed into the cooling liquid in the interior space of the liquid container such that the receiving space is within the interior space, filled with cooling liquid, of the liquid container.

5. The system of claim 1, wherein the cooling unit is configured to convey the cooling liquid to the attachment portion and/or cooling portion, such that the cooling liquid that has been conveyed flows over the attachment portion and or cooling portion of the workpieces to cool the workpieces.

6. The system of claim 1, wherein the system has a first handling unit, to which the ultrasonic tool is attached, wherein the system is configured to control the first handling unit to move the ultrasonic tool along a predetermined movement path relative to the support and or the workpieces.

7. The system of claim 1, wherein the system has a drive which is coupled to the support to move the support along a predetermined drive path, in particular relative to the ultrasonic tool.

8. The system of claim 1, wherein the system has a holding unit, which is configured to hold the workpieces and to arrange the workpieces such that the workpieces are mutually oppositely arranged in the attachment portion and the attachment portion of the workpieces is arranged in the receiving region, wherein the system has a first handling unit, to which the ultrasonic tool is attached, wherein the system is configured to control the first handling unit to move the ultrasonic tool along the workpieces along a predetermined movement path, and wherein the system has a second handling unit, to which the support is attached, wherein the system is configured to control the second handling unit to move the support parallel to the ultrasonic tool.

* * * * *